(12) United States Patent
Tamellini

(10) Patent No.: US 10,017,333 B2
(45) Date of Patent: Jul. 10, 2018

(54) MAGNET TRACK FOR A TRANSPORT DEVICE

(71) Applicant: ETEL SA, Motiers (CH)

(72) Inventor: Valerio Tamellini, Neuchatel (CH)

(73) Assignee: ETEL S.A., Motiers (CH)

( * ) Notice: Subject to any disclaimer, the term of this patent is extended or adjusted under 35 U.S.C. 154(b) by 0 days.

(21) Appl. No.: 15/414,656

(22) Filed: Jan. 25, 2017

(65) Prior Publication Data

US 2017/0210575 A1 Jul. 27, 2017

(30) Foreign Application Priority Data

Jan. 25, 2016 (EP) ..................................... 16152559

(51) Int. Cl.
*B65G 35/00* (2006.01)
*B65G 54/02* (2006.01)
*B65G 21/20* (2006.01)
*H01F 7/02* (2006.01)

(52) U.S. Cl.
CPC ......... *B65G 54/02* (2013.01); *B65G 21/2018* (2013.01); *H01F 7/0205* (2013.01)

(58) Field of Classification Search
CPC ..................................................... B65G 54/02

USPC ......................................................... 198/619
See application file for complete search history.

(56) References Cited

U.S. PATENT DOCUMENTS

| 9,669,730 | B2 * | 6/2017 | Coleman | ................. B60L 13/04 |
| 2015/0283916 | A1 | 10/2015 | Coleman et al. | |
| 2016/0218608 | A1 * | 7/2016 | Floresta | ................. H02K 41/02 |

FOREIGN PATENT DOCUMENTS

| EP | 2930830 A1 | 10/2015 |
| JP | 02041650 A | * 2/1990 |

* cited by examiner

*Primary Examiner* — William R Harp
(74) *Attorney, Agent, or Firm* — Leydig, Voit & Mayer, Ltd.

(57) ABSTRACT

A magnet track for a transport device for moving an armature along the magnet track includes a plurality of linear sections each having an even number of magnets of alternating polarity disposed on a support. In curved regions of the magnet track, the polarity of two adjacent magnets of different sections is the same. A ferromagnetic spacer disposed in each V-shaped gap in the curved regions of the magnet track between the different sections so as to fill the gap.

9 Claims, 1 Drawing Sheet

US 10,017,333 B2

MAGNET TRACK FOR A TRANSPORT DEVICE

CROSS-REFERENCE TO PRIOR APPLICATION

Priority is claimed to European Patent Application No. EP 16152559.7, filed on Jan. 25, 2016, the entire disclosure of which is hereby incorporated by reference herein.

FIELD

The present invention relates to a magnet track for a transport device capable of moving one or more armatures along the magnet track. In addition, the present invention relates to a transport device including such a magnet track.

Transport devices of this type allow workpieces to be moved to and from a plurality of processing stations disposed along the magnet track. The magnet track includes both linear and curved regions and frequently forms a closed path. Linear motors, whose primary elements are disposed inside an armature, are used as drives. Multiple armatures may share the secondary element, which is configured as a magnet track including magnets lined up side by side in a regular pattern, and can be moved independently of each other.

BACKGROUND

A magnet track of the aforementioned type for a transport device is known from EP 2930830 A1. This magnet track is composed of a plurality of linear sections, each having an even number of magnets of alternating polarity disposed on a support. In linear regions of the magnet track, the magnetic orientation of the magnets reverses at regular intervals across abutting sections. However, in curved regions of the magnet track, the polarity of two adjacent magnets; i.e., magnets located side by side, of different sections is the same.

Thus, this prior art magnet track can be assembled from a plurality of identical sections, such as are used for a conventional linear motor. Each section includes a support, on which an even number of magnets are arranged at regular intervals and with alternating magnetic orientation. By lining up a plurality of such sections or supports, it is possible to form a magnet track of any length, which corresponds to that of a conventional linear motor in the linear regions and furthermore allows very precise positioning of the armatures due to the low cogging forces there. In the curved regions, each second support is installed rotated relative to the preceding one by approximately 180° about an axis perpendicular to the plane of the magnet track. The distance to the adjacent supports is slightly enlarged and the orientation is adapted to the desired curvature or path radius. However, the inventor has recognized that these deviations from the regular periodicity of the magnet array produce slightly greater cogging forces than in the linear regions.

SUMMARY

In an embodiment, the present invention provides a magnet track for a transport device for moving an armature along the magnet track. The magnet track includes a plurality of linear sections each having an even number of magnets of alternating polarity disposed on a support. In curved regions of the magnet track, the polarity of two adjacent magnets of different sections is the same. A ferromagnetic spacer disposed in each V-shaped gap in the curved regions of the magnet track between the different sections so as to fill the gap.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention reduces the increased cogging forces in the curved regions of a magnet track in the simplest possible manner without sacrificing the advantages provided by using linear sections of a magnet track also in curved regions.

According to an embodiment, a magnet track for a transport device for moving an armature along the magnet track includes a plurality of linear sections, each having an even number of magnets of alternating polarity disposed on a support. In curved regions of the magnet track, the polarity of two adjacent magnets of different sections is the same, and the V-shaped gaps between the linear sections are filled with ferromagnetic spacers. These spacers carry ferromagnetic teeth and are optimized in shape to reduce cogging forces.

By optimizing the shape of the spacers, it is possible to significantly reduce the disturbance of the periodic arrangement of the magnets, which results from disposing linear sections along curved paths, and also to significantly reduce the additional cogging force resulting therefrom. A base plate of such a spacer and the tooth disposed thereon correspond dimensionally substantially to the linear sections of the magnet track, so that an armature can be moved across the spacers without difficulty. However, the geometry of the tooth can be additionally optimized by various measures for most effective reduction of the cogging force, as will be illustrated below in the description of a specific embodiment.

While the additionally required ferromagnetic spacers entail a certain additional outlay, they can be manufactured from one piece in a relatively simple and cost-effective manner.

Figure 1:
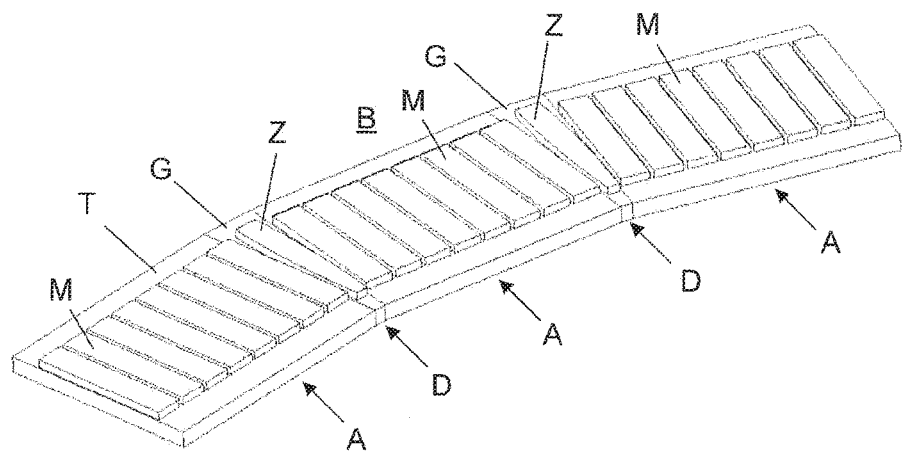
FIG. 1 is an overview of a curved region of a magnet track.
Figure 2:
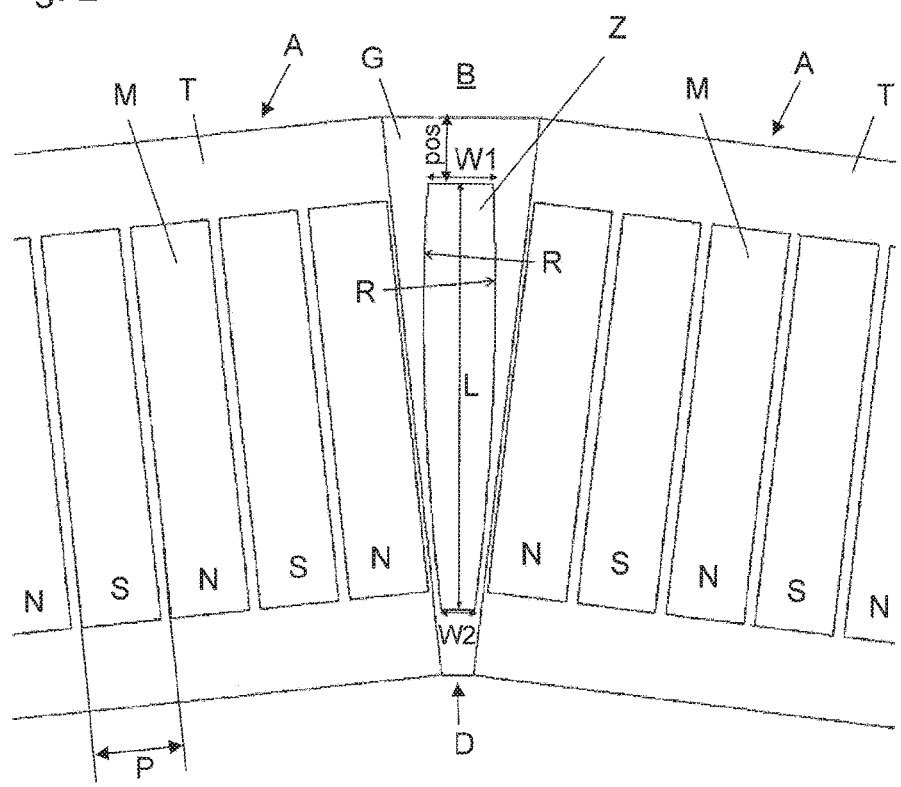
FIG. 2 is a detail view of a portion of this region.

FIGS. 1 and 2 show a curved region of a magnet track B composed of a plurality of linear sections A. Each of these sections A includes a plurality of magnets M arranged with alternating polarity on a support T at equal intervals P along the track direction.

Linear regions of magnet track B can be implemented by sections A abutting end-to-end in flush relationship, while in the curved regions, sections A are arranged at a certain distance from and a certain angle relative to each other. The above-mentioned EP 2930830 A1 describes in detail how this distance should be selected as a function of the desired path radius in order to minimize the additional cogging forces associated with this distance. This prior art forms the basis for the improvements provided by the present invention. The advantageous embodiments described therein with respect to the arrangement of the magnets-carrying sections are also applicable in the context of the present invention.

The deviation from the regular arrangement of magnets M in curved regions of magnet track B inevitably results in increased cogging forces. Therefore, it is proposed that the V-shaped gaps between linear sections A in the curved regions of magnet track B be filled with ferromagnetic spacers D.

These spacers D have a ferromagnetic base plate G, which is also V-shaped and fills the V-shaped gap between sections A. The angle between the edges of base plate G, which extend in a V-shape, must be matched to the particular radius of curvature of magnet track B.

Base plate G further has a ferromagnetic tooth Z disposed thereon. The magnets M located on both sides of this tooth Z and forming part of the adjacent sections A have the same polarity (in FIG. 2, two north poles N are located on both sides of tooth Z), so that ferromagnetic tooth Z, as it where, takes over the function of the missing magnet without itself being a magnet. Like base plate G, the tooth is made of a ferromagnetic material and can therefore contribute to a concentration of the magnetic flux, thereby favorably influencing the cogging forces.

The thickness of base plate G in a direction perpendicular to the plane of magnet track B corresponds to the thickness of supports T of sections A, so that there will be no salient edges at the transitions between sections A and spacers D. The same applies to the length of the abutting edges of sections A and spacers D transverse to the track direction. This measure also makes it possible to use the same fastening technique for spacers D as for linear sections A, which may be secured, for example, by screws or brackets to the respective underlying surface.

Teeth Z have the same thickness as magnets M in a direction perpendicular to the plane of track B, so that an armature can be moved across these spacers D without difficulty. However, the height of tooth Z may also be optimized within certain limits for most effective reduction of the cogging forces.

Apart from that, teeth Z, however, differ from the geometry of magnets M. The length L of teeth Z transverse to the track direction is greater than the corresponding length of magnets M. Moreover, teeth Z are not bounded by straight edges laterally and transversely to the track direction, but preferably by curved shapes, such as, for example, radii R, which also contributes to a certain smoothing of the cogging forces. In addition, the boundary edge of a tooth Z that is located near the outer boundary of curved path B has a length W1 which is greater than the length W2 of the edge located near the inner boundary of curved path B. Thus, tooth Z makes better use of the available space. The position of tooth Z transverse to the track direction, symbolized by the distance pos in FIG. 2, is another free parameter in the design of spacer D.

Parameters L, R, pos, W1 and W2 can be optimized for the radius of curvature of a magnet track B by means of, for example, a simulation calculation of the cogging forces of an armature, and in such a way that the cogging forces generated by the gaps between sections A are minimized. A starting point for, or an example of, such a simulation result or optimized shape can be gathered from FIG. 2, which shows a tooth Z whose proportions can be readily compared to magnets M. The optimal shape of spacers D depends on the path radius desired for the particular application, as well as on the length and width of the primary element used, which moves the armature along magnet track B.

Suitable materials for spacers D include any ferromagnetic materials, such as, for example, iron, unalloyed constructional steel, material no. 1.0037, or highly corrosion-resistant inox steel, material no. 1.4104.

The use of spacers D makes it possible to produce magnet tracks B having curved and straight regions, as well as circular paths or circular segments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A magnet track for a transport device for moving an armature along the magnet track, the magnet track comprising:
   a plurality of linear sections each having an even number of magnets of alternating polarity disposed on a support, wherein, in curved regions of the magnet track, the polarity of two adjacent magnets of different sections is the same and there are a plurality of V-shaped gaps between the linear sections; and
   a ferromagnetic spacer which is not a magnet disposed in each of the V-shaped gaps in the curved regions of the magnet track between the linear sections so as to fill the respective V-shaped gaps.

2. The magnet track as recited in claim 1, wherein the spacers include a V-shaped ferromagnetic base plate and a ferromagnetic tooth disposed thereon.

3. The magnet track as recited in claim 2, wherein a thickness of the base plate in a direction perpendicular to a plane of the magnet track corresponds to a thickness of the support.

4. The magnet track as recited in claim 2, wherein a thickness of the tooth in a direction perpendicular to a plane of the magnet track corresponds to a thickness of the magnets.

5. The magnet track as recited in claim 2, wherein a length of the tooth in a first direction that is transverse to a direction of the magnet track is greater than a length of the magnets in the first direction.

6. The magnet track as recited in claim 2, wherein the tooth is bounded laterally and transversely to a direction of the magnet track by a curved shape.

7. The magnet track as recited in claim 1, wherein the linear sections are identical to each other and the spacers are identical to each other.

8. The magnet track as recited in claim 1, wherein, in linear regions of the magnet track, the polarity of adjacent magnets reverses at regular intervals across abutting sections.

9. A transport device having a linear drive, comprising:
a magnet track comprising:
  a plurality of linear sections each having an even number of magnets of alternating polarity disposed on a support, wherein, in curved regions of the magnet track, the polarity of two adjacent magnets of different sections is the same and there are a plurality of V-shaped gaps between the linear sections; and
  a ferromagnetic spacer which is not a magnet disposed in each of the V-shaped gaps in the curved regions of the magnet track between the linear sections so as to fill the respective V-shaped gaps,
wherein the linear sections and the spacers form a secondary element of the linear drive.

* * * * *